(No Model.)

H. STOVER.
CLOTHES POUNDER.

No. 475,090. Patented May 17, 1892.

Witnesses.
A. Ruppert
H. A. Daniels

Inventor:
Henry Stover
Per
Thomas P. Simpson
Atty.

UNITED STATES PATENT OFFICE.

HENRY STOVER, OF LANARK, ILLINOIS.

CLOTHES-POUNDER.

SPECIFICATION forming part of Letters Patent No. 475,090, dated May 17, 1892.

Application filed August 26, 1891. Serial No. 403,811. (No model.)

*To all whom it may concern:*

Be it known that I, HENRY STOVER, a citizen of the United States, residing at Lanark, in the county of Carroll and State of Illinois, have invented certain new and useful Improvements in Washing-Machines; and I do hereby declare the following to be a full, clear, and exact description of the invention, such as will enable others skilled in the art to which it appertains to make and use the same.

The invention relates to that class of washing-machines known as "pounders;" and it consists in the improvement hereinafter described, and then pointed out in the claim.

Figure 1:
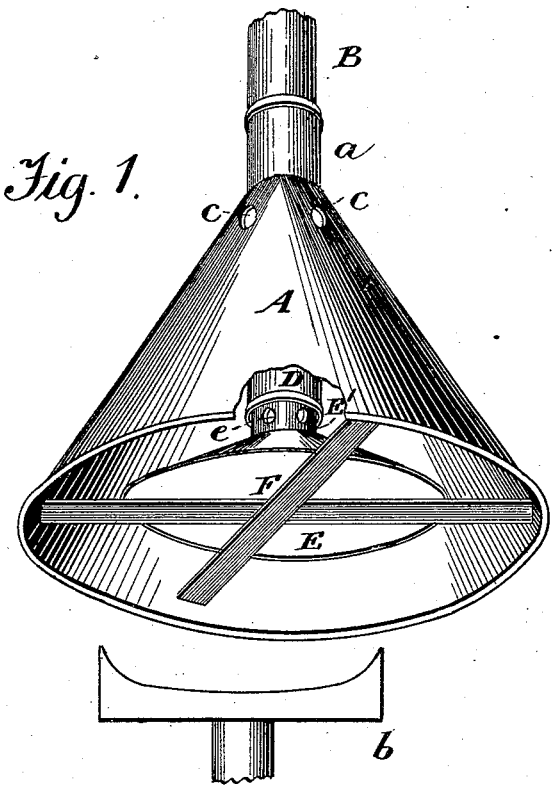
Figure 2:
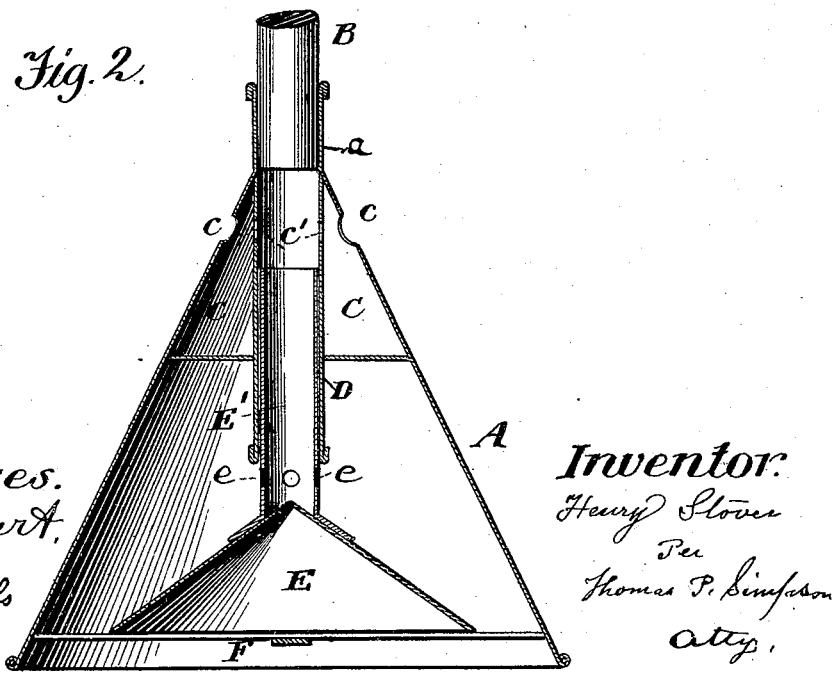

Figure 1 of the drawings is a perspective view, and Fig. 2 a diametrical vertical section.

In the drawings, A represents the pounder, which is made in the usual conical or funnel shape, with the socket $a$, in which fits the handle B with the arm-rest $b$.

C is an air-chamber, with the air-inlets $c$ and the holes $c'$, through which the air passes into the bottom-open tube D. The valve E is made conical and provided with a bottom-closed but top-open tubular shank E', which works up and down in the tube D, and has the air-holes $e$, through which the air passes into the pounder-chamber.

F F are diametrical cross-bars at or near the bottom of pounder and on the inside thereof, so as to prevent the valve E from dropping when the pounder is lifted up.

The operation is as follows: The pounder is reciprocated up and down upon the clothes, which are arranged in a suitable vessel containing warm soapsuds. As it rises, the valve opens and allows a free entrance of air to the interior of the pounder. When the pounder reaches its intended altitude and begins to go down, the valve closes, and the contained air is forced through the clothes.

Having thus described all that is necessary to a full understanding of my invention, what I claim as new, and desire to protect by Letters Patent, is—

A washing-machine pounder consisting of the conical vessel A, with handle-socket $a$ and cross-bars F F, the air-chamber C, with air-inlets $c$ on the outer side, the interior bottom-open tube D, with air-holes $c'$, and the valve E, with tubular shank having air-holes $e$, all substantially as shown and described.

In testimony whereof I affix my signature in presence of two witnesses.

HENRY STOVER.

Witnesses:
 AMOS WOLF,
 DANIEL S. LICHTY.